Oct. 30, 1928.
E. F. JOYCE
1,689,632
HANGER FOR TROLLEY WIRES
Filed Sept. 16, 1926
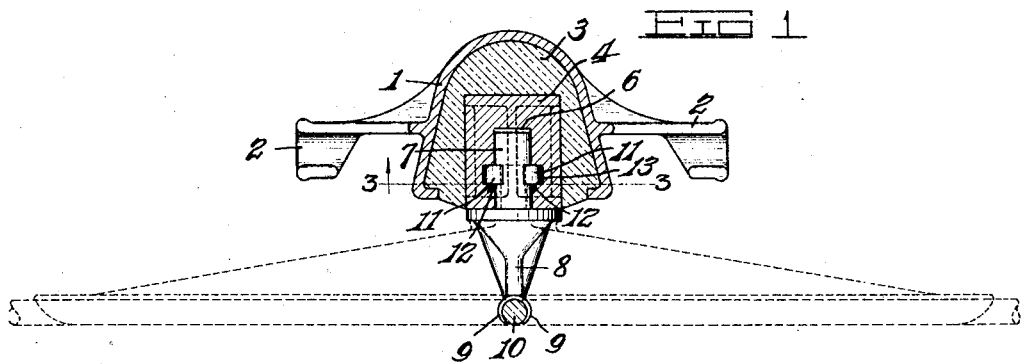
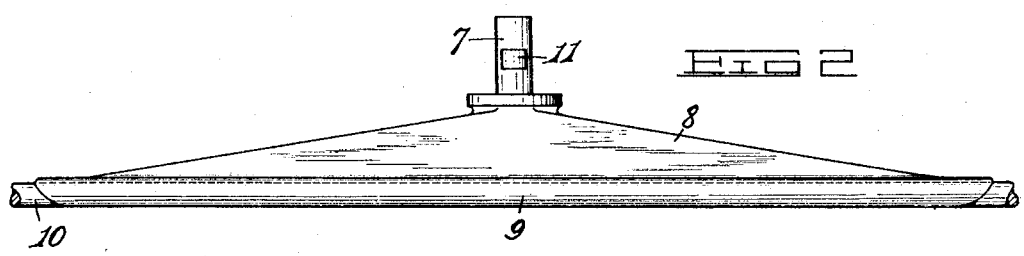
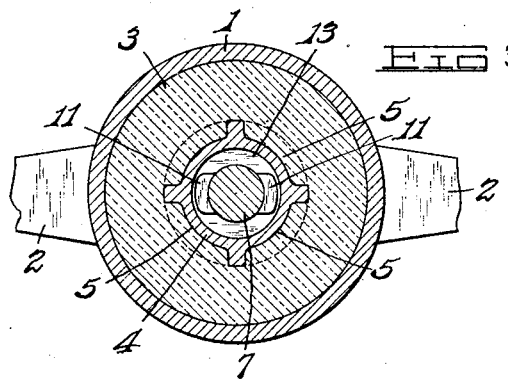
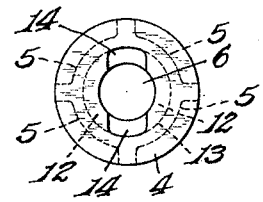
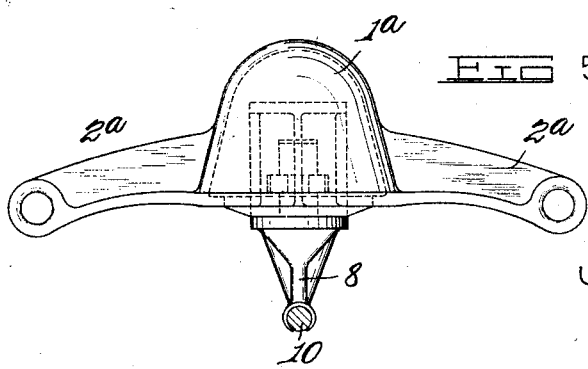
INVENTOR
Edward F. Joyce
BY
ATTORNEY Patented Oct. 30, 1928.

1,689,632

UNITED STATES PATENT OFFICE.

EDWARD F. JOYCE, OF WHEELING, WEST VIRGINIA.

HANGER FOR TROLLEY WIRES.

Application filed September 16, 1926. Serial No. 135,793.

This invention relates broadly to suspension devices for trolley wires, and more particularly to a trolley ear and suspension means therefor.

The primary object of the invention is to provide a trolley wire hanger which is devoid of threaded parts and which, therefore, is not liable to become corroded to the extent that detachment of the trolley ear from its suspension bell, or yoke, is rendered difficult.

A further object is to provide a trolley ear and suspension yoke having novel and improved means of attachment which render them at all times readily attachable and detachable.

In describing the invention in detail, reference is herein had to the accompanying drawings, in which—

Figure 1 is a sectional elevation of the invention, showing the parts in their attached relation;

Figure 2 is a side elevation of the trolley ear;

Figure 3 is an enlarged section on line 3—3, Fig. 1;

Figure 4 is an end elevation of the socket piece of the suspension yoke; and—

Figure 5 is an elevation of a suspension device embodying the invention, the suspension yoke shown being of a form differing from that shown in Fig. 1.

Referring to said drawings, 1 designates the bell and 2 the oppositely directed arms of a suspension yoke, said arms being designed for mounting upon a suspension wire in the manner usual to such yokes. Said bell is filled with a suitable insulating material or compound 3 in which is embedded a centrally disposed socket piece 4 of substantially cylindrical form and which has exteriorly thereof and intermediate its ends flute-like recesses 5 for the reception of such insulating material whereby it is retained in position.

Provided in said socket piece 4 and opening outwardly through its lower end is a vertical socket 6 of generally cylindrical form adapted for the reception of a vertical pin or post 7 carried centrally of its top portion by a trolley ear 8 which has the lips 9 thereof peened into clinched supporting relation to the trolley wire 10. The post 7 has a pair of lugs 11 formed on diametrically opposite sides of its periphery, which lugs are located in positions at right angles to the length of the trolley ear 8 and are designed to seat upon shoulders 12 located interiorly of said socket piece 4 and formed by the provision of a circular channel 13 located annularly with respect to the socket 6 at a suitable point in the length of the latter.

Extending longitudinally from the lower end of said socket piece to said internal annular channel 13 are diametrically opposite guide grooves 14 which form ways through which the lugs 11 of the post 7 are entered to positions registering with the channel 13 and from which, by a quarter turn of the trolley ear 8, said lugs are moved into seated relation to the shoulders 12.

The post 7 and the trolley ear 8 of which it is an integral part, are made of a suitable non-corrosive metal, as brass, and it is preferred that the socket piece 4 be made of a similar non-corrosive material. So made, the interengaging parts will at all times be readily disengageable, thus overcoming the objectionable features of prior suspension structures involving screw threaded members of iron or steel which readily become corroded through exposure to moisture.

As is manifest, the trolley ear is attached to the suspension yoke by introducing the end of the post 7 thereof in the socket 6 with said ear held in a position at right angles to the length of said yoke, then forcing said post upward in said socket, with the lugs 11 thereof traveling in the ways 14 of said socket piece, and then rotating said trolley ear throughout a quarter turn from the position shown in dotted lines in Fig. 1 to the position shown in full lines in said figure for disposing said lugs in overlying seated relation to the shoulders 12. The trolley ear and the suspension yoke are normally maintained in their interengaged relation by the trolley wire and the suspension wire to which they are respectively attached.

What is claimed is—

A trolley wire suspension device including a suspension member having a bell, a vertical socket in the bell, means to secure the socket to the bell, said socket having an internal annular channel forming shoulders, said channel communicating with the socket interior and disposed at a distance below the top of the socket and at a distance above the lower end of the socket and further having spaced longitudinal ways leading from its lower end into said channel, and a trolley wire engaging member having an upright post formed with lugs receivable in said ways and in the channel, said lugs being located at a distance above the lower end of the post and at a distance below the upper end of the post whereby said post has elongated parts engaging the socket both above and below the channel thereof.

In testimony whereof, I affix my signature.

EDWARD F. JOYCE.